(12) United States Patent
Schmitz

(10) Patent No.: US 7,527,051 B2
(45) Date of Patent: May 5, 2009

(54) OVEN AND ASSOCIATED FLOOR CONSTRUCTION

(75) Inventor: Paula Schmitz, Edgewood, WA (US)

(73) Assignee: Premark FEG L.L.C., Wilmington, DE (US)

( * ) Notice: Subject to any disclaimer, the term of this patent is extended or adjusted under 35 U.S.C. 154(b) by 555 days.

(21) Appl. No.: 11/119,862

(22) Filed: May 2, 2005

(65) Prior Publication Data

US 2006/0243266 A1    Nov. 2, 2006

(51) Int. Cl.
F24C 15/32    (2006.01)
(52) U.S. Cl. ............... 126/21 R; 126/21 A; 126/20
(58) Field of Classification Search ............... 126/21 R, 126/21 A, 20; 99/476, 474, 477; 34/191; 219/400, 401; 52/506.02, 396.01, 462, 471, 52/588.1, 394, 395
See application file for complete search history.

(56) References Cited

U.S. PATENT DOCUMENTS

| | | | |
|---|---|---|---|
| 1,536,427 A | 5/1925 | Degner | |
| 1,852,526 A | 4/1932 | Kemp | |
| 1,857,447 A | 5/1932 | Engels | |
| 1,878,519 A | 9/1932 | Hoppe | |
| 1,891,802 A | 12/1932 | Drew | |
| 1,897,802 A | 2/1933 | Henkel | |
| 2,145,954 A | 2/1939 | Semple et al. | |
| 2,175,954 A | 10/1939 | Cook | |
| 2,351,487 A | 6/1944 | Cooney | |
| 2,384,390 A | 9/1945 | Nalbach et al. | |
| 2,767,667 A | 10/1956 | Spooner | |
| 3,148,674 A | 9/1964 | Boardman et al. | |
| 3,537,405 A * | 11/1970 | Verhoeven | 426/523 |
| 3,905,760 A | 9/1975 | Johansson et al. | |
| 3,926,106 A | 12/1975 | Deusing et al. | |
| 3,954,053 A | 5/1976 | Johansson et al. | |
| 4,029,463 A | 6/1977 | Johansson et al. | |
| 4,202,259 A | 5/1980 | Johansson | |
| 4,357,522 A | 11/1982 | Husslein et al. | |
| 4,381,442 A | 4/1983 | Guibert | |
| 4,387,535 A * | 6/1983 | Corbo | 49/468 |
| 4,492,216 A | 1/1985 | Dumont | |
| 4,515,143 A | 5/1985 | Jabas | |
| 4,627,409 A | 12/1986 | Kagomoto | |
| 4,648,377 A | 3/1987 | Van Camp | |
| 4,779,604 A | 10/1988 | König | |
| 4,782,214 A | 11/1988 | Voegtlin | |
| 4,813,398 A | 3/1989 | Savage | |
| 4,823,766 A | 4/1989 | Violi | |
| 4,869,155 A | 9/1989 | Grieve | |
| 4,909,236 A | 3/1990 | Del Fabbro | |
| 4,975,047 A | 12/1990 | Mitsuhashi et al. | |

(Continued)

FOREIGN PATENT DOCUMENTS

WO    WO 2005/096826    10/2005

OTHER PUBLICATIONS

Adamatic Hobart Service Manual—Rack Ovens—67 pages—Sep. 1989.

(Continued)

*Primary Examiner*—Alfred Basichas
(74) *Attorney, Agent, or Firm*—Thompson Hine LLP

(57) ABSTRACT

An oven construction includes a floor construction for the baking chamber.

23 Claims, 13 Drawing Sheets

U.S. PATENT DOCUMENTS

| | | | |
|---|---|---|---|
| 5,014,679 A | 5/1991 | Childs et al. | |
| 5,129,384 A | 7/1992 | Parks | |
| 5,394,791 A | 3/1995 | Vallee | |
| 5,429,112 A | 7/1995 | Rozzi | |
| 5,441,405 A | 8/1995 | Bedford et al. | |
| 5,475,958 A | 12/1995 | Josefsson et al. | |
| 5,556,566 A | 9/1996 | Cappello et al. | |
| 5,615,603 A | 4/1997 | Polin | |
| 5,617,839 A | 4/1997 | Jennings et al. | |
| 5,717,192 A | 2/1998 | Dobie et al. | |
| 5,814,789 A | 9/1998 | O'Leary et al. | |
| 5,845,631 A | 12/1998 | Kleva et al. | |
| 6,021,709 A | 2/2000 | Koopman et al. | |
| 6,061,967 A * | 5/2000 | Judds | 49/469 |
| 6,121,582 A | 9/2000 | Dollinger et al. | |
| 6,494,199 B1 | 12/2002 | Zia et al. | |
| 6,557,543 B2 | 5/2003 | Cole et al. | |
| 2002/0178681 A1 * | 12/2002 | Zancai et al. | 52/592.1 |
| 2003/0005644 A1 * | 1/2003 | Reithmeyer et al. | 49/467 |
| 2003/0205222 A1 | 11/2003 | Rabas et al. | |
| 2006/0283090 A1 * | 12/2006 | Moody | 49/467 |

OTHER PUBLICATIONS

Hobart Food Equipment Flier—HO300G Mini Rotating Rack Oven—Gas—Features, Options, Specifications—2 pages—Apr. 2001.

Baxter Flier—OV300G Gas Mini Rotating Oven Rack—Features, Specifications—2 pages—May 2001.

Hobart Food Equipment Flier—HSRO Single Rack Gas Oven—Options, Specifications, Details, Dimensions—2 pages—May 1997.

EP Search Report dated Sep. 22, 2006 for PCT/IB2006/051376.

* cited by examiner

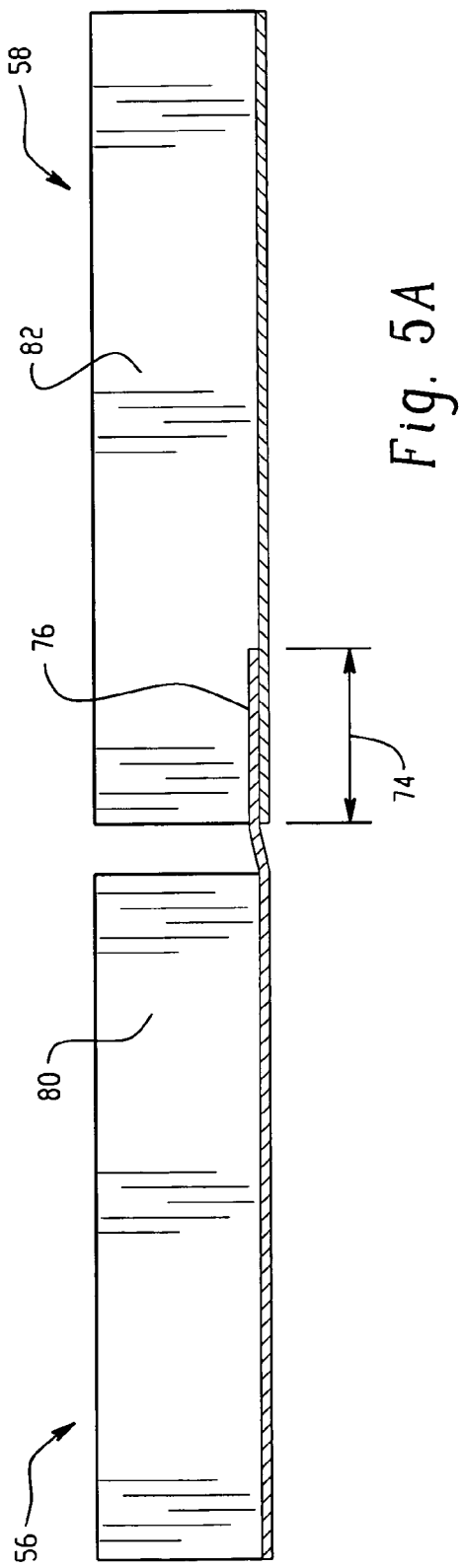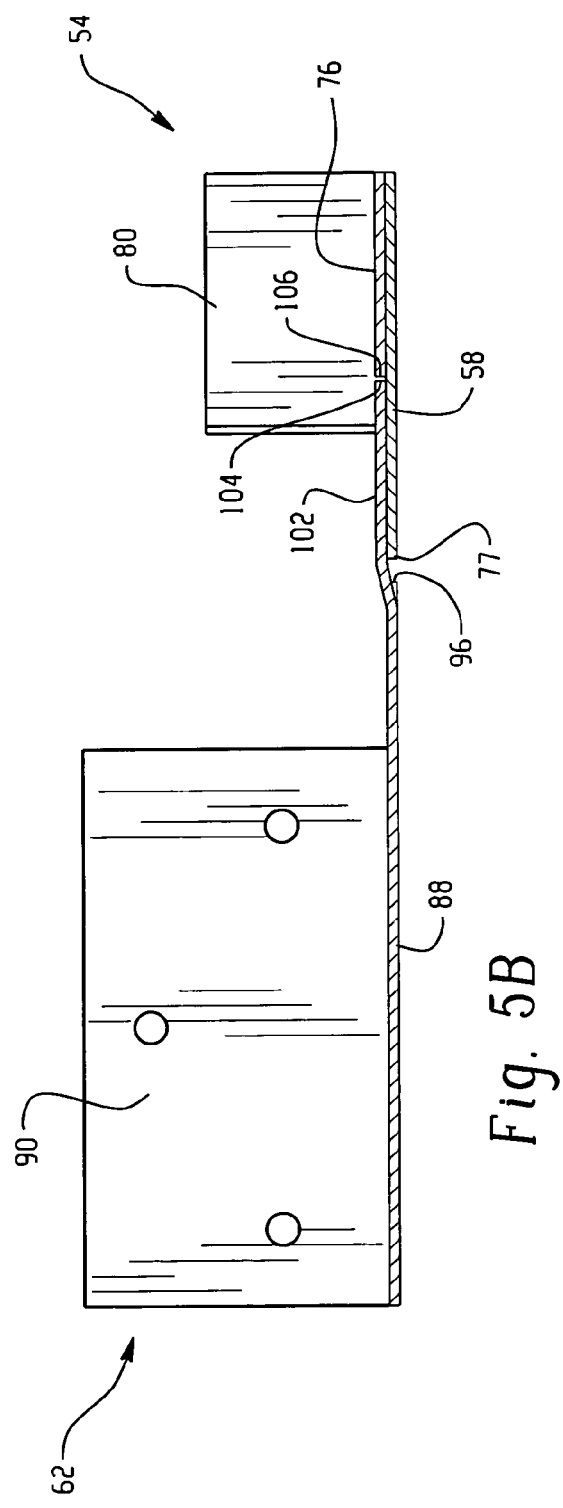

HORIZONTAL GAP

HORIZONTAL GAP CLOSES

OVEN AND ASSOCIATED FLOOR CONSTRUCTION

TECHNICAL FIELD

The present invention relates generally to convection ovens used for baking items such as bread and, more particularly, to a baking chamber floor construction for a convection oven such as a rack oven.

BACKGROUND

Rack ovens are generally equipped with a fuel-fed heating element and a fan for moving heated air throughout a baking chamber to provide a rapid distribution of hot air over the food product. Commercial ovens of this type include a baking chamber, which is sized to receive a rack having multiple shelves containing products to be baked; a power driven, rotating mechanism to rotate the product as it is being cooked or baked; a heat exchanger including one or more gas burners and an exhaust system to eliminate combustion gases; and a circulating system for directing hot air along a heated air flow path that passes through the baking chamber. Conventional rack ovens of the type for baking bread also generally include a steam generator for the introduction of steam into the oven for brief periods of time, usually at the beginning of the baking process, to impart a desired color and crispness to the crust of the bread.

Typical rack ovens also commonly include baking chamber floor constructions that include a non-insulated single floor panel that is mounted to the floor on which the oven sits and/or is rigidly, non-adjustably connected to the side walls of the oven. During operation, these mounted floors may experience buckling due to thermal expansion. This floor construction can also be used on non-gas burning versions of ovens, such as electric versions.

SUMMARY

In an aspect, an oven installed at a baking site includes a baking chamber defined by at least first and second walls, a door frame at least in part defining an opening to the baking chamber and a first baking chamber floor panel. A second baking chamber floor panel partially overlaps a portion of the first floor panel to form an overlap region between the first and second floor panels. A threshold member is located at the opening and extends between opposite sides of the door frame. The threshold member overlaps an edge portion of at least one of the second floor panel and the first floor panel.

In another aspect, an oven including a baking chamber, a door frame at least in part defining an opening to the baking chamber and a door connected to the door frame where the door rests in a threshold region when the door is in a closed position is provided. The oven includes a floor construction and a threshold member at least partially disposed in the threshold region. The threshold member includes a first upwardly extending member adjacent a side of a first door jamb of the door frame and a second upwardly extending member adjacent a side of a second door jamb of the door frame. Spacing between the first upwardly extending member and the second upwardly extending member is set at a distance for truing up the door frame.

In another aspect, a method of installing an oven at a baking site is provided. The method includes securing a first baking chamber floor panel in a baking chamber of the oven. A second baking chamber floor panel is secured in the baking chamber of the oven such that it overlaps the first floor panel with the second floor panel forming an overlap region. One or both of the first floor panel and the second floor panel is overlapped by a threshold member partially located at a threshold region of the oven.

BRIEF DESCRIPTION OF DRAWINGS

FIGS. 5A and 5B are section views along the lines A-A and B-B of FIG. 5, respectively;

DESCRIPTION

Figure 1:
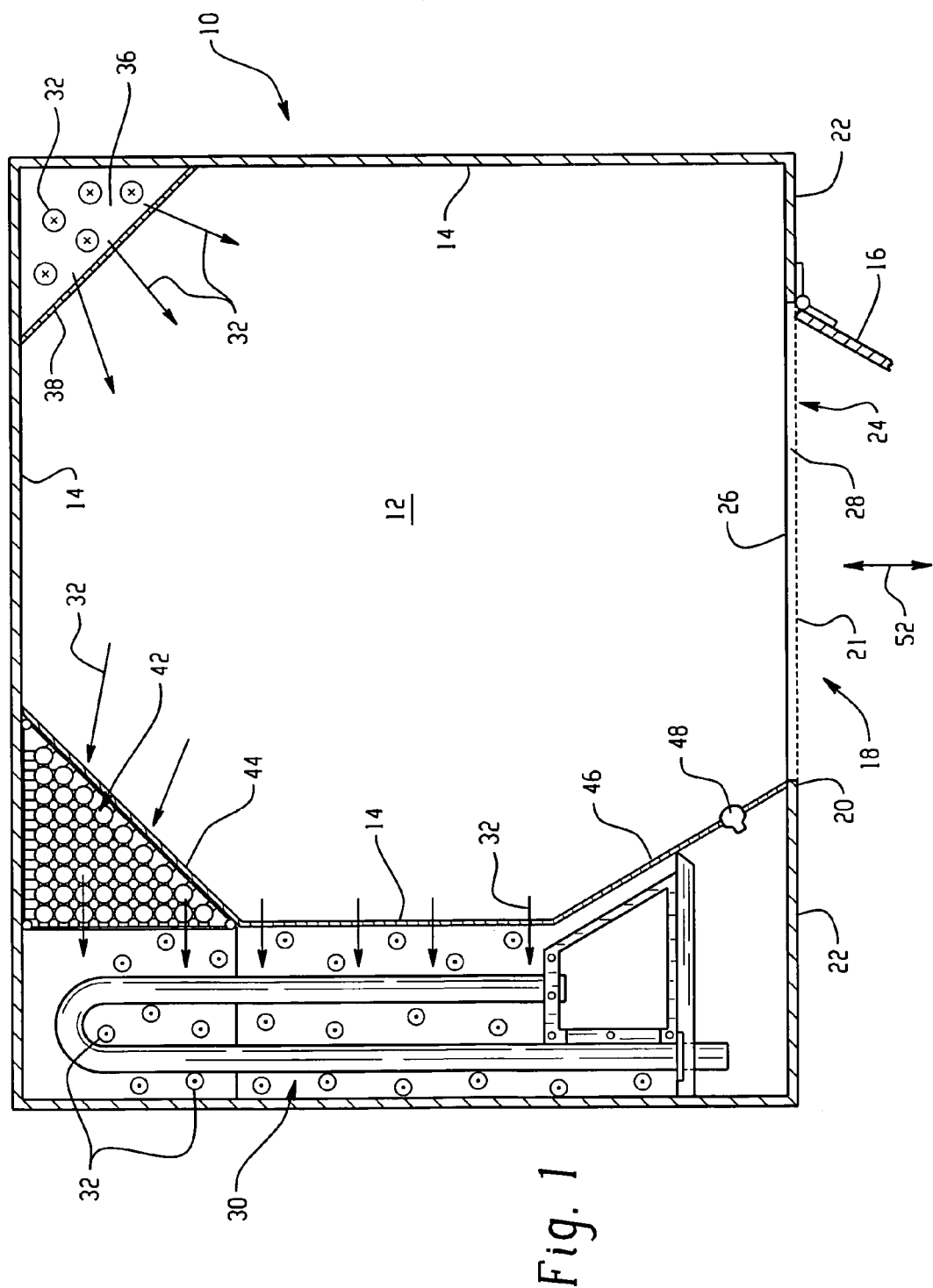
FIG. 1 is a top plan view of an embodiment of an oven.

Referring to FIG. 1, a top plan view of an oven 10 is shown. The oven 10 includes a baking chamber 12 defined by a plurality of walls 14. Door 16 (shown only in part) provides access to the baking chamber through opening 18 that is formed by door frame 20. Door frame 20 can be formed as a separate member or series of interconnected separate members and attached to front 22 or the door frame (or at least a part of the door frame) may be formed by front 22, itself, without any separate member attached thereto. Door 16 rests in threshold region 24 with the door in its closed position, for example, during a baking operation. The threshold region 24 generally begins at an interior side 26 of a door footprint 28 and ends at an exterior side 21 of the door footprint. Footprint 28 is formed with door 16 in its closed position. A heat exchanger 30 is located outside the baking chamber 12.

Figure 2:
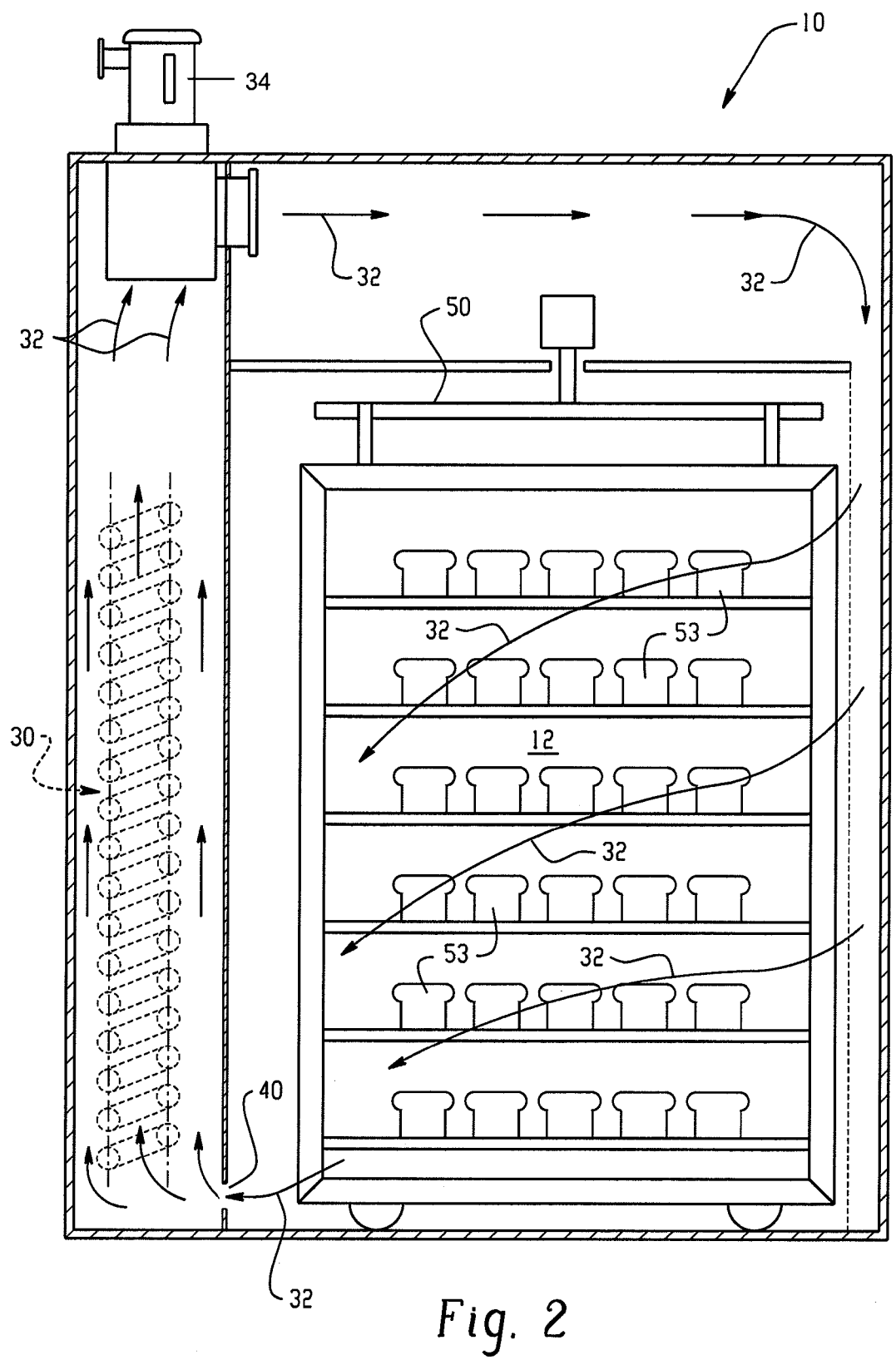
FIG. 2 is front elevation of the oven of FIG. 1.

As shown by the arrows 32 in FIGS. 1 and 2, during a baking procedure a fan or other blower 34 may be operated to cause heated air to flow along an air flow path that extends upward through the heat exchanger 30, over the top of the baking chamber 12, downward through a corner channel 36, through a panel 38 into and through the baking chamber 12, through a slot 40 or series of openings in the left baking chamber wall 14 and back up through the heat exchanger 30. A portion of the heated air also flows through a corner located steam generator 42, with a panel 44 (having apertures or slots) separating the steam generator 42 from the baking chamber 12, and with wall 14 including an opening or openings that extend along the height of the steam generator 42 to provide the air into the heat exchanger 30. The steam generator 42 may take the form of a thermal mass, such as an iron mass that collects heat, and an associated source of water that delivers water onto the thermal mass, with heat of the thermal mass converting the water to steam. The panel 44 may also be solid (no apertures or slots) and mounted in a manner spaced from walls 14 and/or the floor to provide air flow slots. A front, left corner panel 46 with one or more lights 48 positioned therein is also shown in FIG. 1.

Also shown in FIG. 2 is a rotatable rack 50 within baking chamber 12, the rack holding goods 53 to be baked. The oven 10 includes a lift and rotate mechanism (as known in the art) to lift and rotate the rack. In some embodiments, the oven does not include a rotate mechanism, i.e., the oven is a non-rotatable rack oven. The rack 50 can be lowered and wheeled into and out of the baking chamber 12 through the opening 18 in an access direction 52 (FIG. 1). The oven 10 may be a single integrated unit or may be formed by modules connected together, such as a baking chamber module and a heat exchanger module. Features of oven 10 are described in greater detail in U.S. Pat. No. 6,837,234, filed Apr. 25, 2003, the content of which is hereby incorporated by reference as if fully set forth herein.

Figure 3:
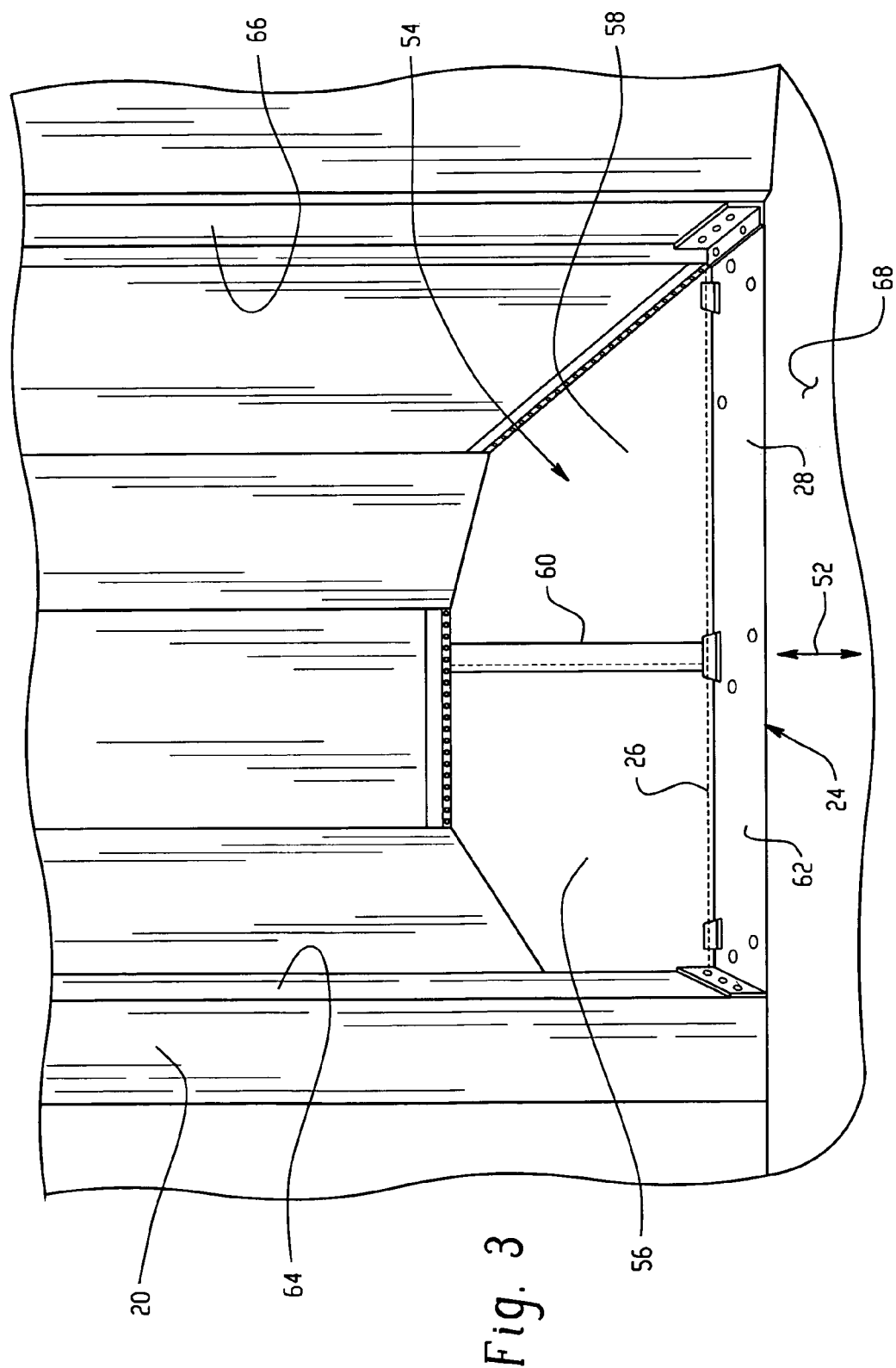
FIG. 3 is a perspective view of an embodiment of a floor assembly of the oven of FIG. 1.

Referring now to FIG. 3, a floor construction 54 includes a baking chamber floor panel 56 and a baking chamber floor panel 58. Floor panel 56 overlaps floor panel 58 to form a seam 60 that extends generally in the access direction 52. A threshold member 62 extends between opposite sides 64 and 66 of door frame 20. Threshold member 62 constrains the floor construction 54 by overlapping a portion thereof. The threshold member 62 is, in turn, affixed to one or both of the building floor 68 and door frame 20 at a location adjacent the floor panels 56, 58 and outside the internal side 26 of the door footprint 28. In some cases, the threshold member 62 is affixed to one or both of the building floor 68 and frame 20 within the threshold region 24 (see FIG. 1). This arrangement can eliminate any need for anchoring the floor panels 56, 58 directly to the building floor 68, for example, by passing a fastener through an opening formed in the floor panels. A suitable material for forming threshold member 62 includes stainless steel, however, other materials may be used.

Figure 4:
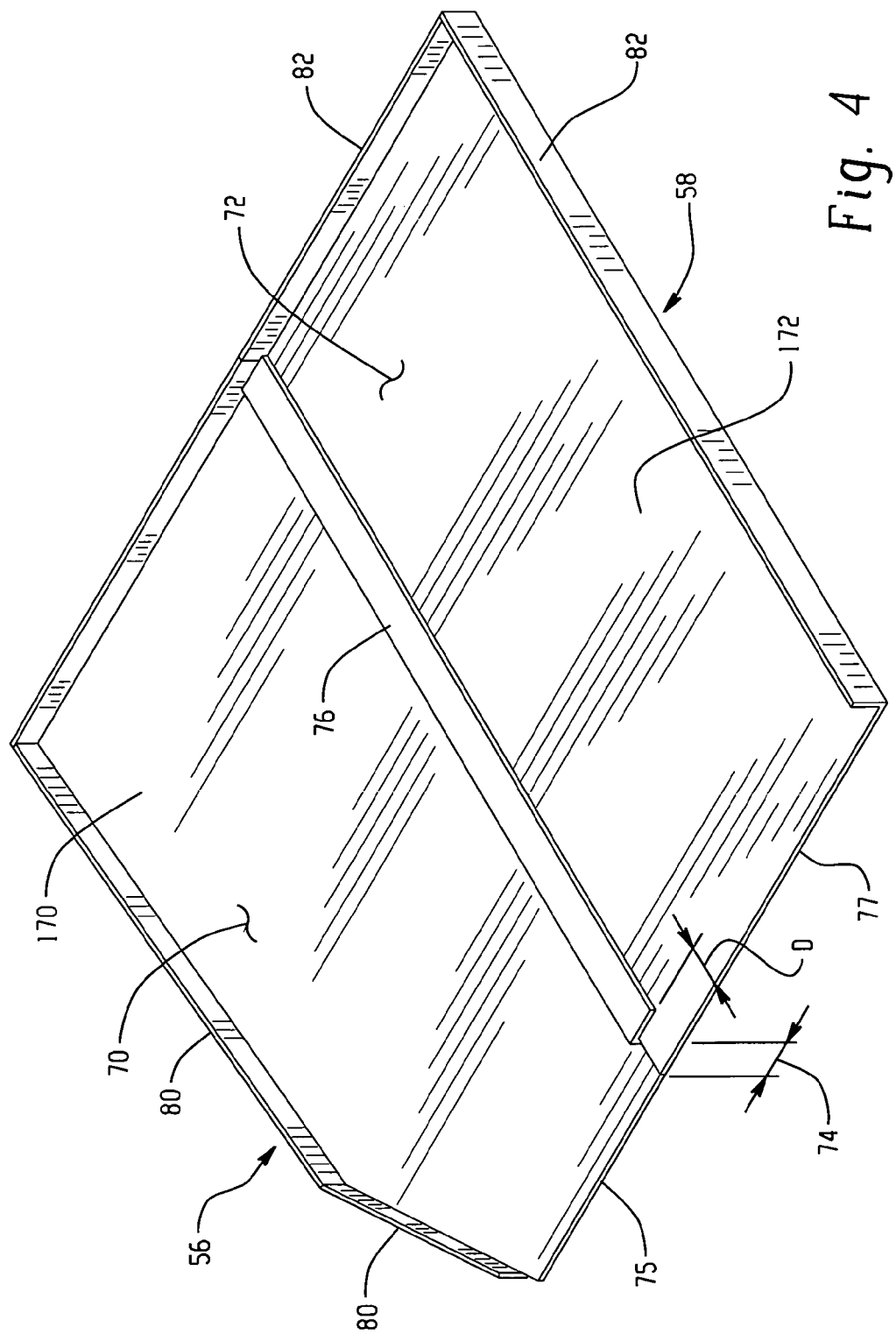
FIG. 4 is a perspective view of an embodiment of a floor construction of FIG. 3.

Referring to FIG. 4, a bottom portion 70 of the floor panel 56 partially overlaps a bottom portion 72 of the floor panel 58 as shown along region 74. The floor panel 56 includes an offset bend 76 to achieve the overlap (see also FIGS. 5 and 5A). Other alternatives for achieving the overlap are possible, such as forming a recess in the floor panel 56 that is sized to receive the floor panel 58. In one embodiment, the overlapping portions of the two floor panels 56, 58 are not secured together, thus allowing some relative movement between the two floor panel bottom portions. The seam or overlap region 74 may be preferably placed in a center portion of the baking chamber so as to provide floor panels of approximately the same size, whereas if one floor panel were laterally larger than the other floor panel, the larger floor panel would tend to experience greater thermal expansion. Additionally, central placement of the overlap region 74 can provide relatively smooth rolling paths 170 and 172 extending front to back of the oven 10. However, variations in size are possible.

As can be seen by FIG. 4, overlap region 74 is offset a distance D from a front edge 75 and 77 of the floor panels 56 and 58, respectively. In other words, offset bend 76 does not extend all the way to front edges 75 and 77.

Each floor panel 56 and 58 includes respective upturned flanges 80 and 82 that may be provided by bending portions of the floor panel. In this regard, the floor panels may be stainless steel or some other suitable material. The flanges 80 and 82 may be in the range of about 1 inch to 2 inches in height, although variations are possible. Edges 75, 77 of respective floor panels 56 and 58 are provided without the upturned flange to facilitate positioning of such portions along the doorway that provides access to the oven baking chamber. In one embodiment, the edges 75 and 77 are positioned to or stop at the interior side of the door so as not to interfere with the door or any gasket that may be associated with the bottom surface of the door for sealing purposes.

Figure 5:
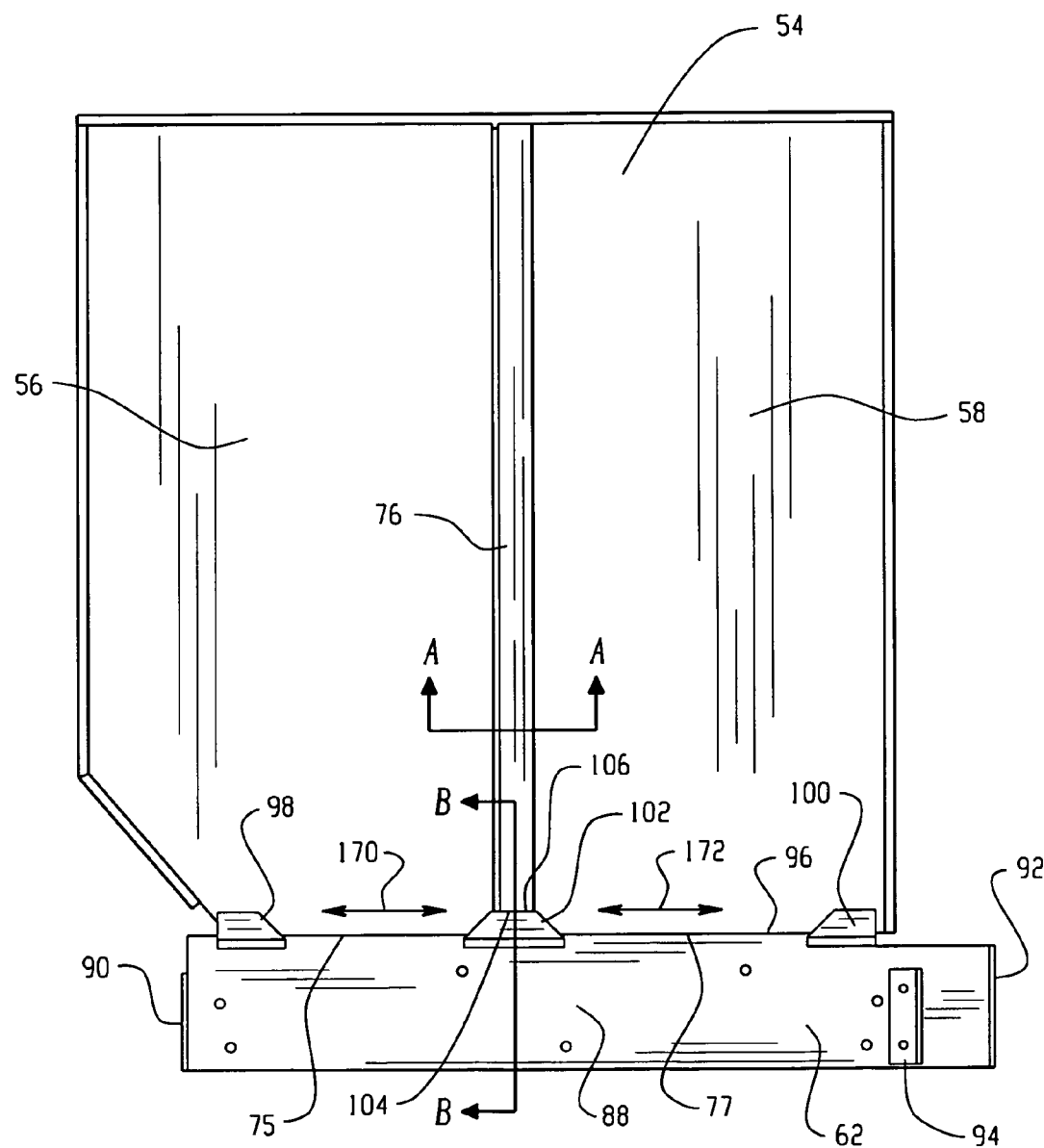
FIG. 5 is a top view of the floor construction and threshold member of FIG. 3.

Referring to FIG. 5, threshold member 62 and floor construction 54 are shown in top view in isolation. Threshold member 62 includes bottom plate 88 and upwardly extending end mounts 90, 92 disposed at opposite ends of the bottom plate 88. A bracket 94 is connected to the bottom plate 88 at a location between the end mounts 90, 92. In some embodiments, bracket 94 with an upwardly extending portion is formed as a separate member and then attached to the bottom plate 88 while end mounts 90 and 92 are formed by bending end regions of the bottom plate 88 upwardly. Extending outwardly from the threshold member 62 and beyond an edge 96 of the threshold member are constraining members 98, 100 and 102. Constraining members 98, 100 and 102 overlap one or, in some instances, both of the floor panels 56 and 58 and, as will be described below, constrain the floor construction 54 using one or both of the building floor 68 or the frame 20 (FIG. 3). The constraining members 98, 100, 102 can be formed separately from the bottom plate 88 and attached thereto (e.g., by welding) or the constraining members 98, 100, 102 can be formed with the bottom plate 88 (e.g., by stamping and/or cutting).

As can be seen by FIG. 5, constraining members 98 and 100 overlap the floor panel 56 and the floor panel 58, respectively. Referring also to FIG. 5B, constraining member 102 overlaps the floor panel 58 with an end 104 near or, in some cases, even abutting an end 106 of the offset bend 76. End 104 of the constraining member 102 abuts end 106 of the offset bend 76 due to the bend's offset distance D from front edge 75 and 77 of both floor panels 56 and 58, respectively. Constraining member 102 may also overlap the floor panel 56 and floor panel 58 at respective sides of offset bend 76.

Figure 6:
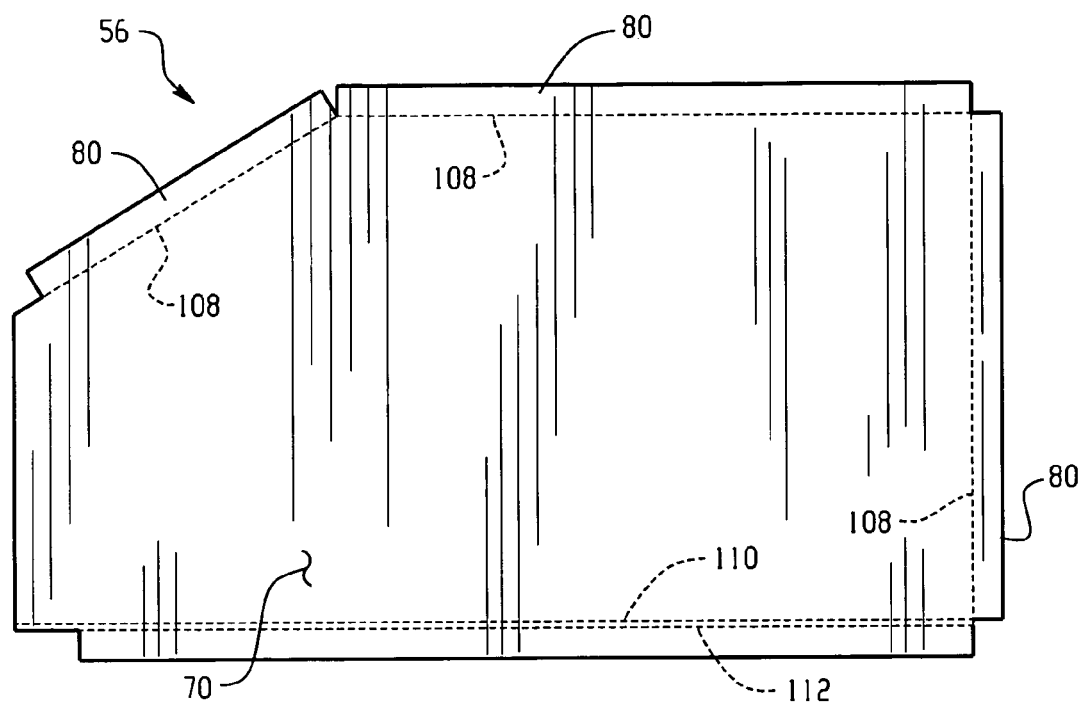
FIGS. 6 and 7 show an embodiment of a floor panel of the floor construction of FIG. 5.
Figure 7:
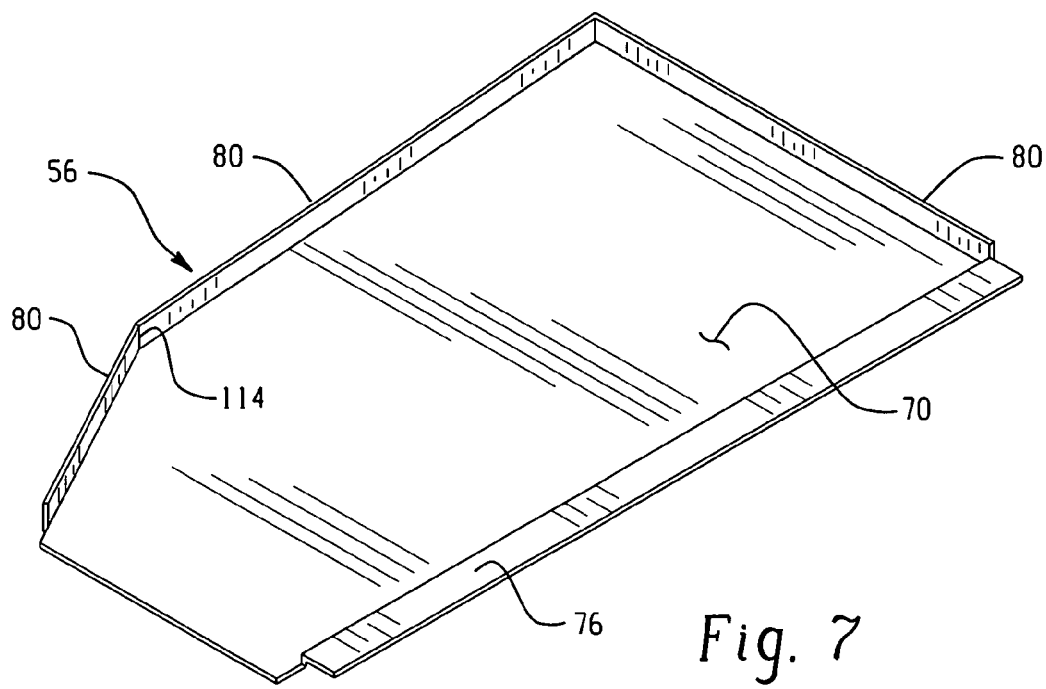
Figure 8:
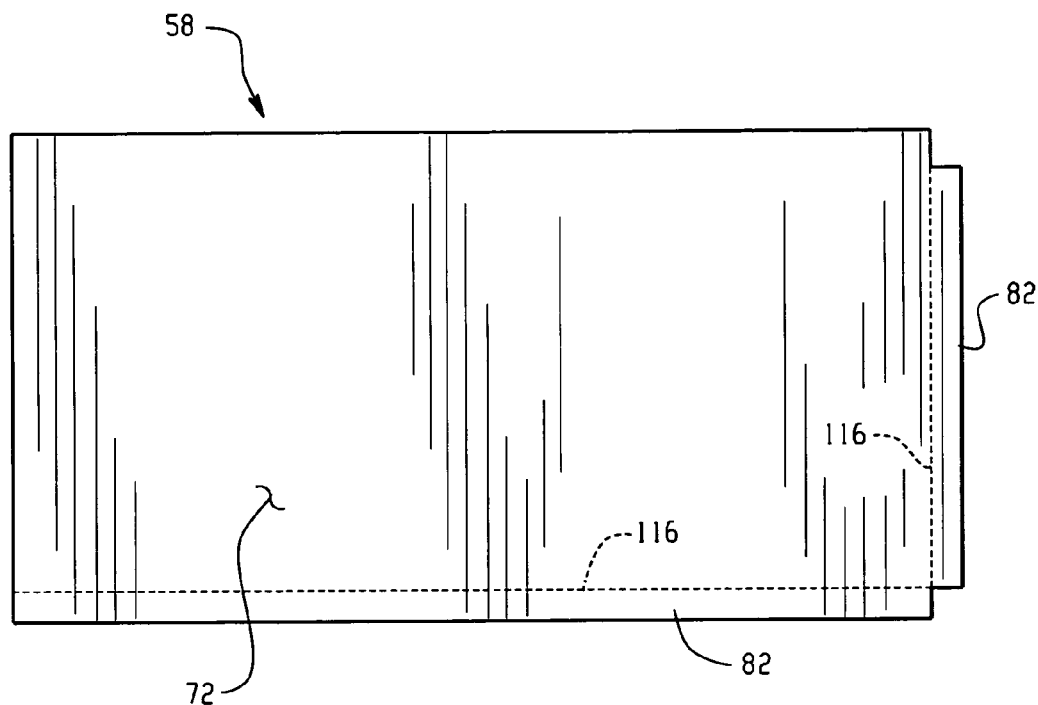
FIGS. 8 and 9 show an embodiment of another panel of the floor construction of FIG. 5.
Figure 9:
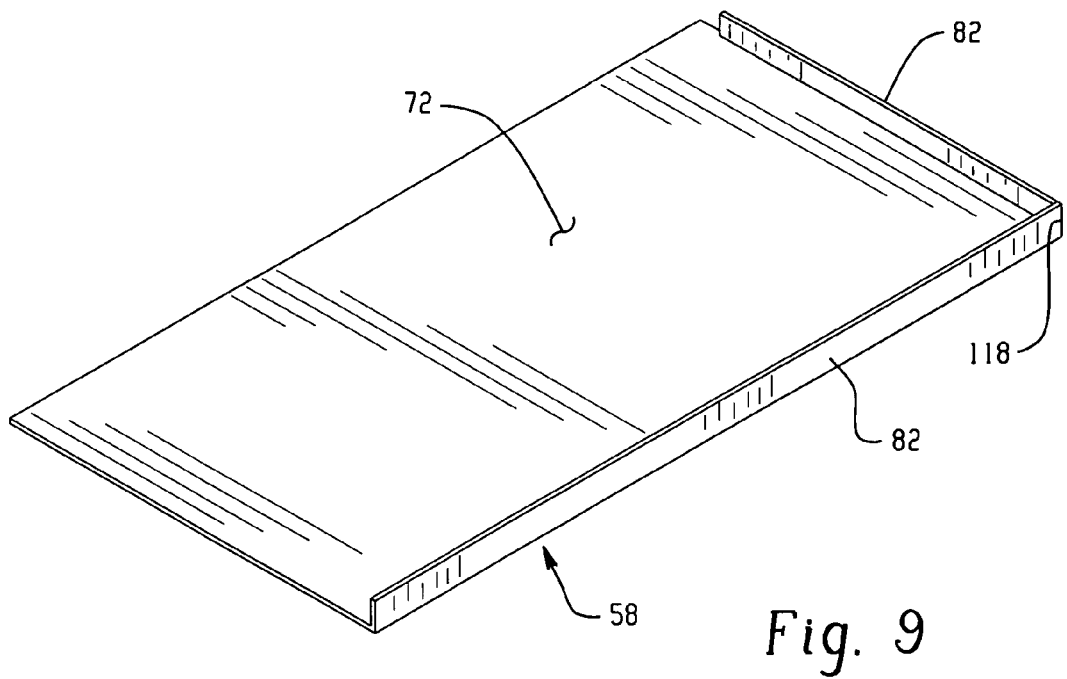

FIGS. 6 and 7 illustrate a method of forming floor panel 56 including the offset bend 76 while FIGS. 8 and 9 illustrate a method of forming the floor panel 58. Referring first to FIGS. 6 and 7, the floor panel 56 is cut out from a sheet of metal to include bottom portion 70 and flange portions 80 prior to being bent into their upward positions. Bend lines 108 are shown in dashed form. Upward bend line 110 and downward bend line 112 are also shown for forming the previously mentioned offset bend portion 76. FIG. 7 shows the floor panel 56 after the final bends have been made. The seams 114 between adjacent flanges 80 can be welded or otherwise sealed if desired.

FIG. 8 shows a top view of floor panel 58 prior to final assembly, showing the floor panel 58 as cut out from a sheet of metal and including bottom portion 72 and flange portions 82 prior to being bent into their upward positions. Bend lines 116 are shown in dashed form. FIG. 9 shows the floor panel 58 after the final bends have been made. The seam 118 between adjacent flanges 82 can be welded or otherwise sealed if desired.

Figure 10:
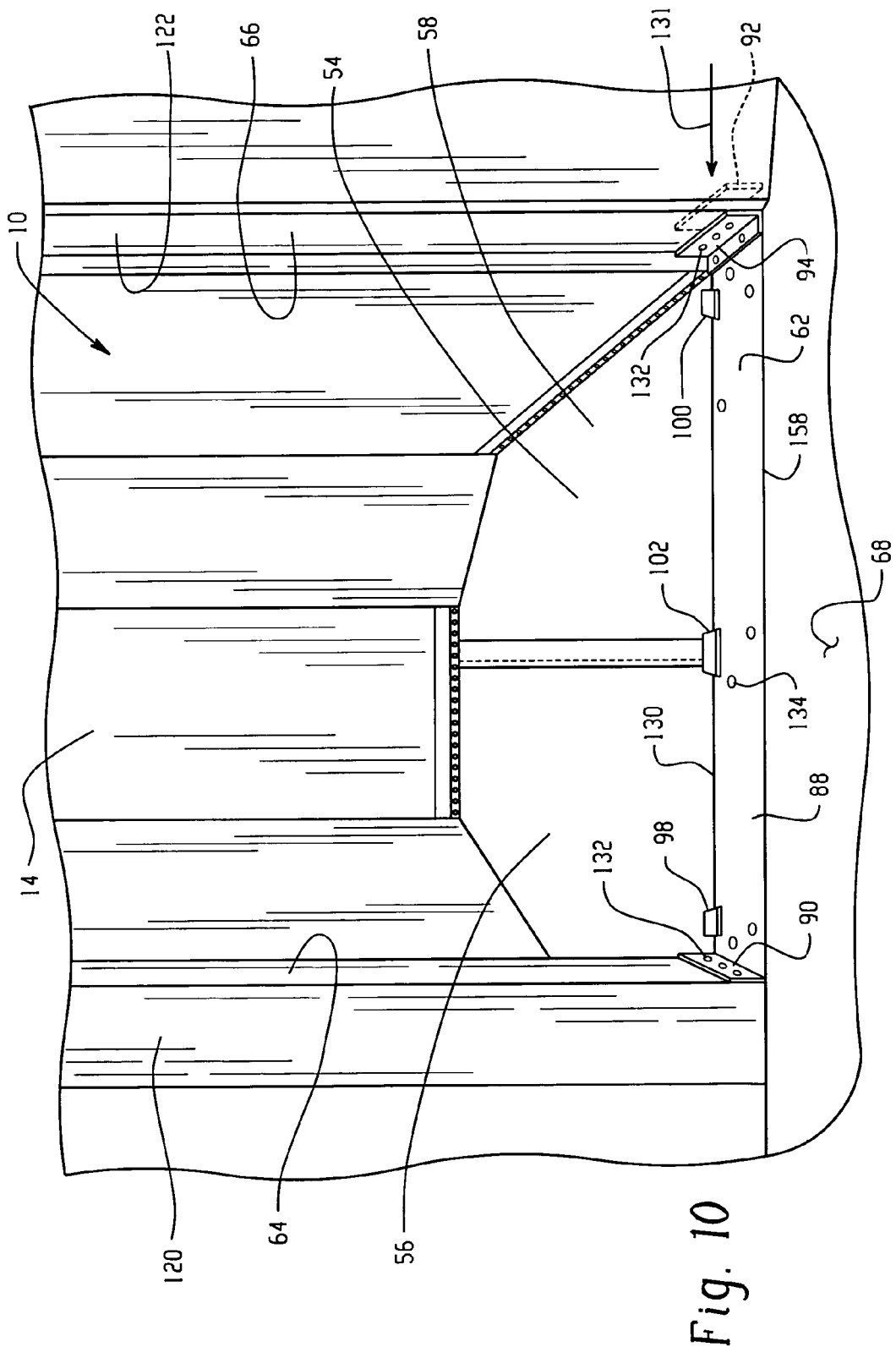
FIG. 10 is a perspective view of an installed floor assembly.
Figure 11:
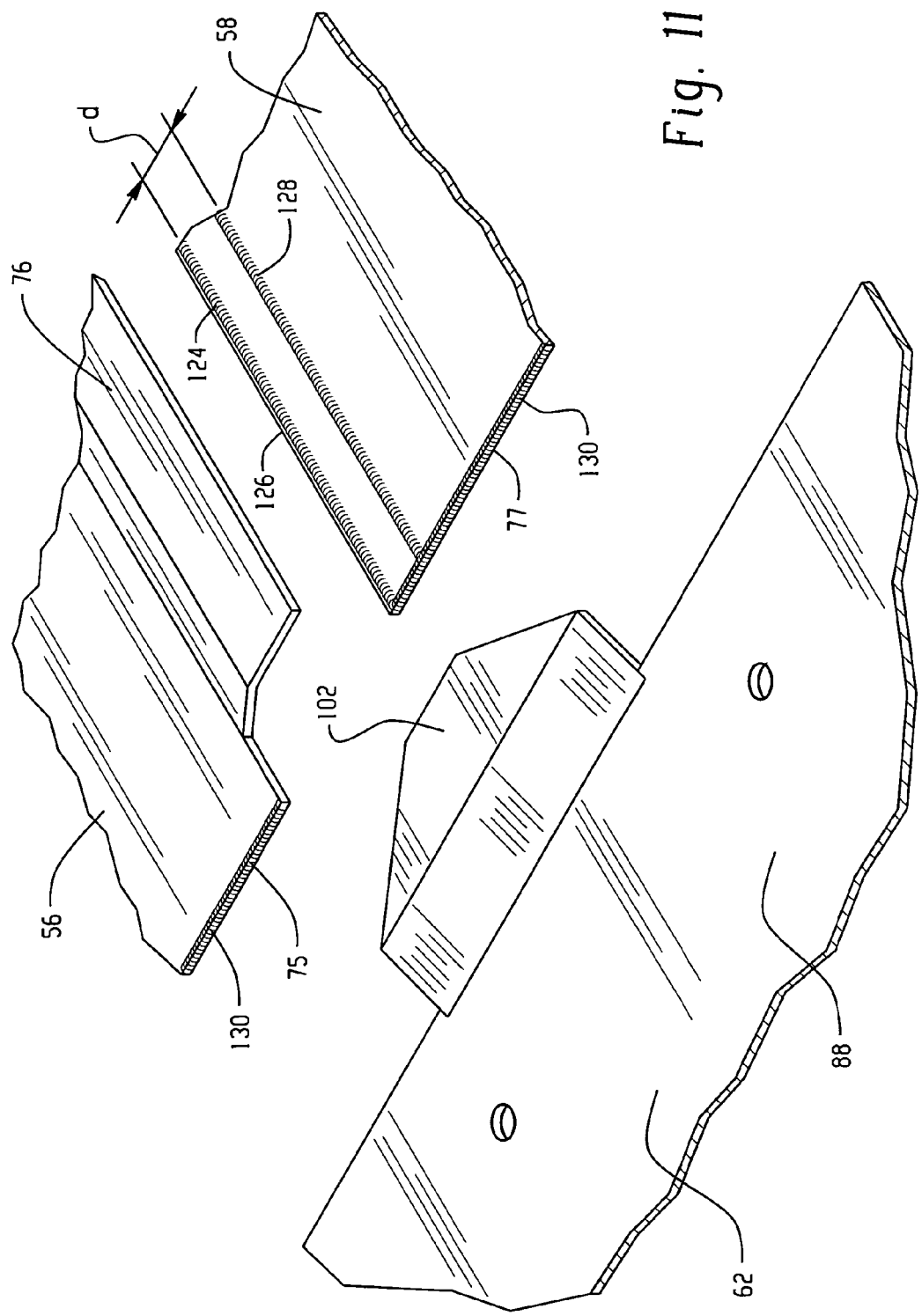
FIG. 11 illustrates a method of installing the floor assembly of FIG. 10.

Referring to FIGS. 10 and 11, to assemble the floor construction 54 and threshold member 62, the oven walls are first installed and the structure is leveled using levelers (not shown). In some instances, it may be necessary to insert shims (not shown) under one or both of door jambs 120, 122 to level the oven 10. In instances where a shim is to be placed under door jamb 122, it may be preferable, but not always necessary, to install the shim after threshold member 62 is in place. Using a sealing device and sealant, a seal is formed along an inside perimeter (not shown) of the walls 14 of the oven 10 between the oven and building floor 68 before installation of the floor construction 54. In some instances, a seal is not formed along an inside perimeter of the walls 14 between the oven 10 and the building floor 68.

Referring particularly to FIG. 11, the floor panel 58 is secured within the oven 10. Once the floor panel 58 is secured, a first bead 124 of sealant is run along edge 126 from front (i.e., nearer the door opening) to back (i.e., further from the door opening) of the floor panel 58. A second bead 128 of sealant is run parallel to the first bead 124 and spaced apart a distance d therefrom. In some embodiments, d is between about ¼ inch and about ¾ inch, such as about ½ inch. The floor panel 56 is secured within the oven 10 such that the offset bend 76 overlaps the floor panel 58 as described above and the floor panels are tapped into the oven corners. A third bead 130 of sealant is run along front edges 75 and 77 of the floor panels 56 and 58.

Referring still to FIGS. 10 and 11, to locate threshold member 62, the bottom plate 88 is slipped under door jamb 122 between the door jamb 122 and the building floor 68 such that the door jamb 122 is located between end mount 92 (FIG. 5) and bracket 94 (FIG. 10). In some embodiments, bottom plate 88 is designed such that it is also slipped under door jamb 120. In some instances, it may be necessary to raise the door jambs 120, 122 for added clearance to allow bottom plate 88 to slide under the door jambs 120, 122. Once the bottom plate 88 is slid under the door jamb 122, the constraining members 98, 100 and 102 are guided to overlap portions of the associated floor panel 56 and floor panel 58 as described above. In order to position the constraining members 98, 100 and 102, it may be necessary to use a wedge (not shown), for example, a screwdriver, to guide the constraining members. The edge 96 of the threshold member bottom plate 88 may abut the front edges 75, 77 floor panels 56, 58 with the third bead 130 disposed therebetween within a gap (e.g., of about 0.125 inch or less).

The threshold member 62 is pushed in the direction of arrow 131 so that end mount 90 abuts against the opening side of the door jamb 120 and bracket 94 abuts against the interior side 66 of door jamb 122. Thus, the spacing between end mounts 90 and 94 may be preset to aid in squaring up or truing up the doorway opening. Holes 132 are drilled and tapped in door jambs 120, 122 to securely attach the end mount 90 and bracket 94 to the door frame. In some embodiments, holes 132 are drilled prior to locating the threshold member 62. In some instances, holes 132 are also tapped through end mount 92 to secure the end mount 92 to door jamb 122. Fasteners such as screws can be used to fasten the threshold member 62 to the door jambs 120 and 122. Threshold member 62 is mounted to the building floor 68 using openings 134 and, for example, fasteners extending through openings 134 of the bottom plate 88. Once threshold member 62 is secured to the building floor 68, the door frame 20 will be held in a fairly stable position due to the connection of the threshold member to the door jambs 120 and 122. Any unsealed seams can be sealed using a sealant. A suitable sealant is a high temperature RTV silicone, as an example.

Figure 12:
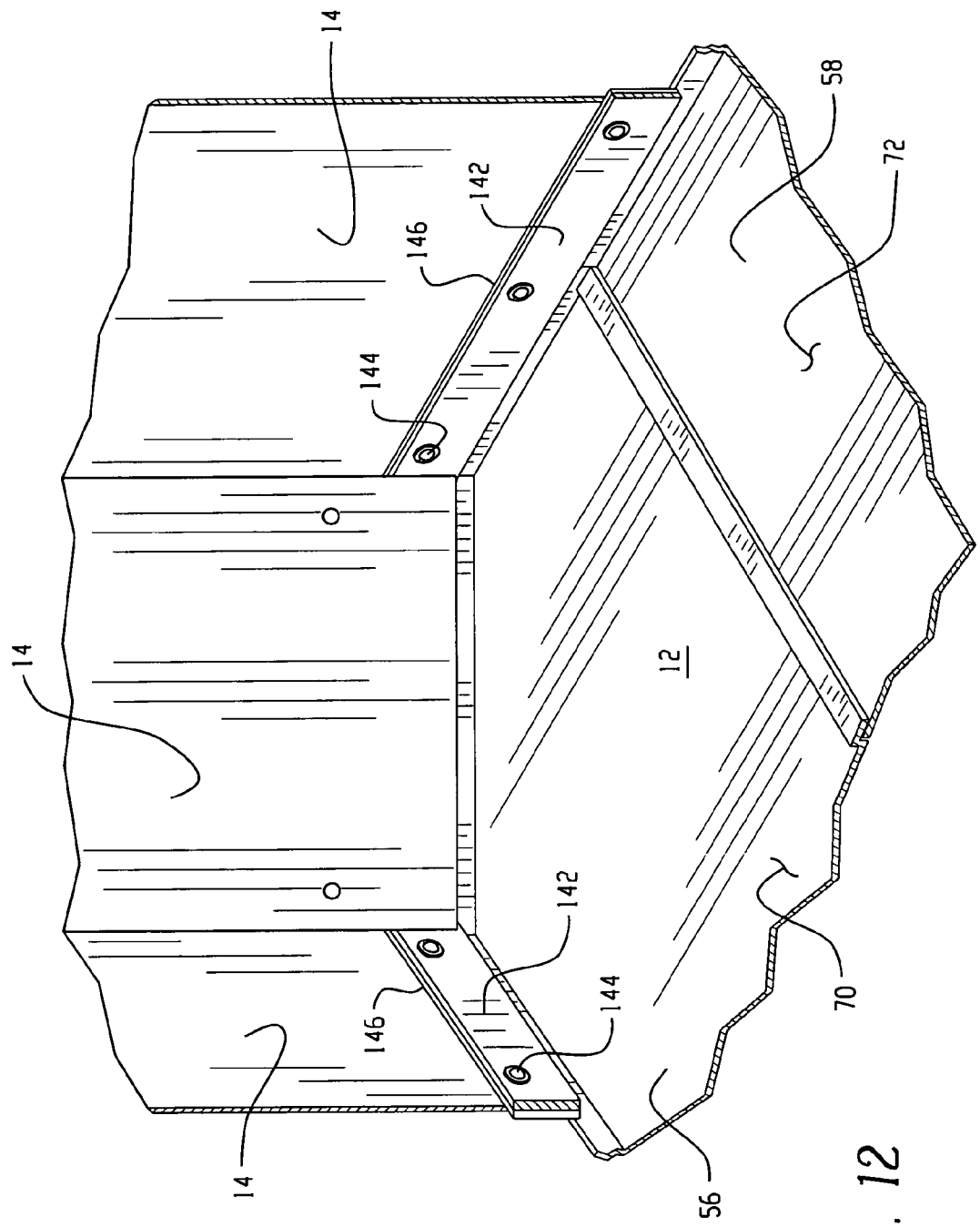
FIG. 12 illustrates a method of locating the floor construction of FIG. 10 in the oven of FIG. 1.
Figure 12B:
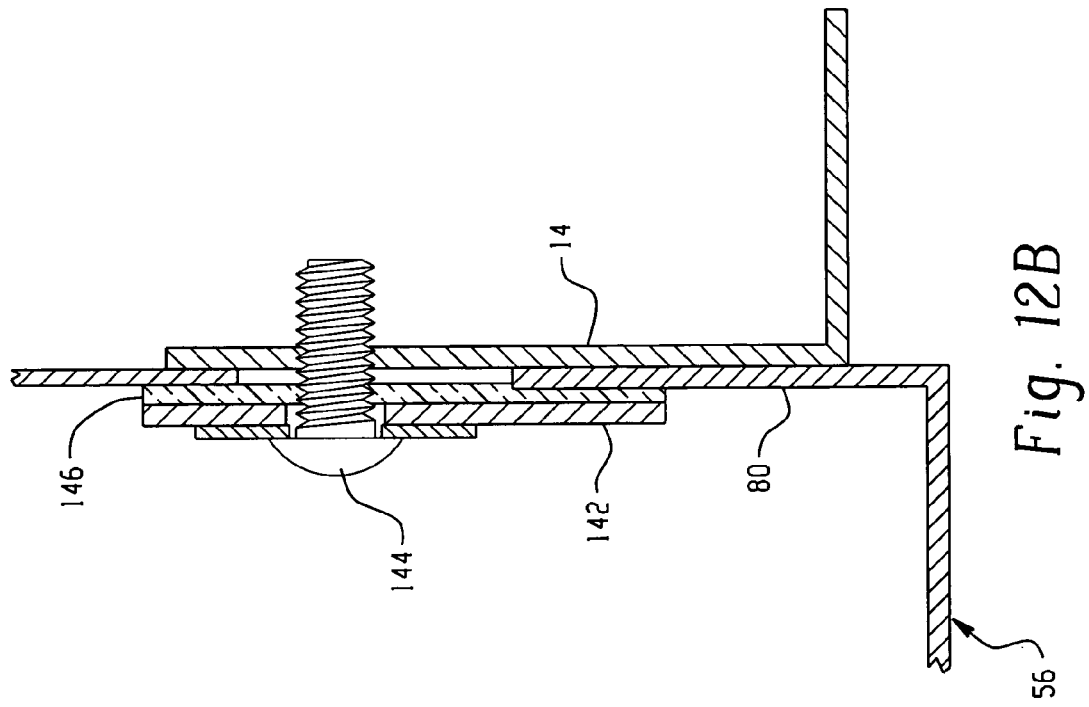
FIGS. 12A and 12B are partial cross-sections illustrating connection of the floor panels to walls of the oven.
Figure 12A:
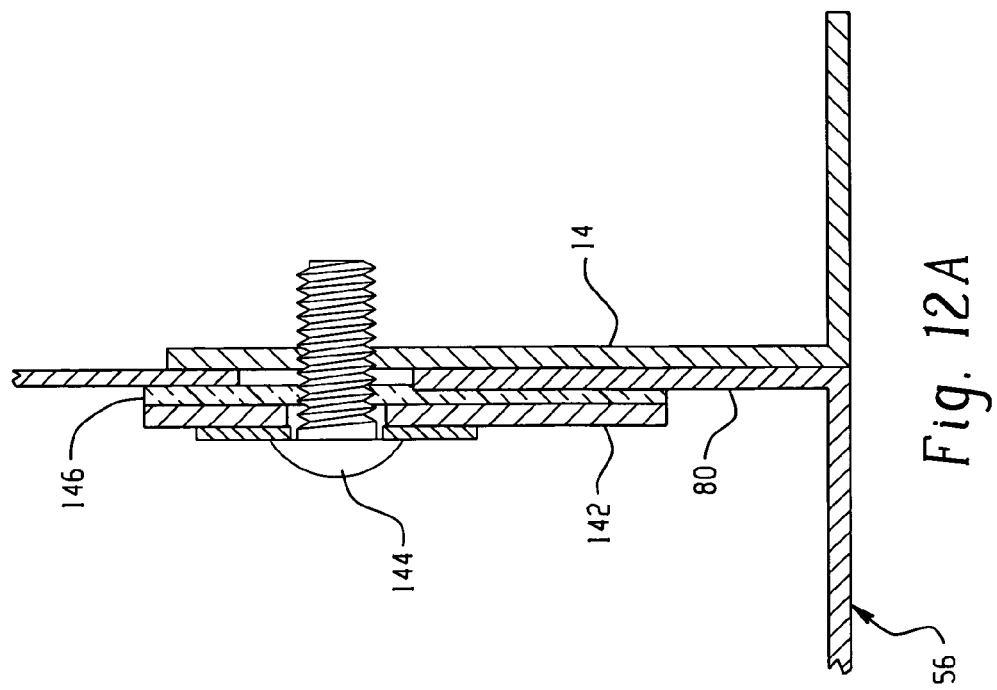

The floor panels 56 and 58 can be secured within the oven by any desirable method prior to locating the threshold member 62. In one embodiment, as shown in the partial perspective view of an oven baking chamber 12 in FIG. 12, the walls 14 defining the baking chamber are provided with trim pieces 142, which in one embodiment may be simple strips of stainless steel. As shown in the cross-sectional views of FIGS. 12A and 12B where the floor panel 56 is considered, when the floor panels are positioned within the chamber 12, the upwardly turned flanges 80 are positioned between the trim pieces 142 and the oven walls 14. Threaded fasteners 144 extend from the trim pieces 142 to engage the walls 14 and can be adjusted to secure the flanges 80 tightly therebetween and thus hold the floor panel 56 in the desired position. A gasket 146 may also be provided between the trim pieces 142 and the walls 14 to engage the flanges 80 and provide a sealing function to the arrangement. In the illustrated embodiment, the gasket is positioned between the trim pieces 142 and the flanges 80.

The flanges 80 are not engaged by the fasteners 144 and therefore can be adjusted upward or downward between the trim pieces 142 and the walls 14 when the fasteners 144 are loosened. This arrangement also enables the trim pieces 142 and associated fasteners 144 to be pre-applied to the oven walls 14 prior to delivery and set up. The illustrated adjustment zone may be in the range of about ½ inch to 2 inches, but variations are possible. This adjustment zone allows the floor panel 56 to be secured to the oven walls 14 at different heights so that the entire bottom portion 70 of the floor panel 56 can rest upon the oven site floor/ground regardless of how level the oven site floor/ground happens to be. If the oven is moved to a different site, adjustment to suit the new oven site floor/ground conditions is facilitated by simply loosening the fasteners 144, adjusting the floor panel 56 as needed and then re-tightening the fasteners 144.

Figure 13A:
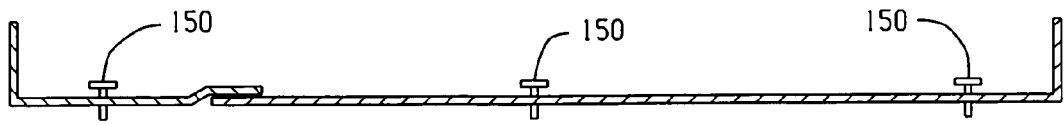
FIGS. 13A and 13B exemplify a PRIOR ART oven floor construction.
Figure 13B:
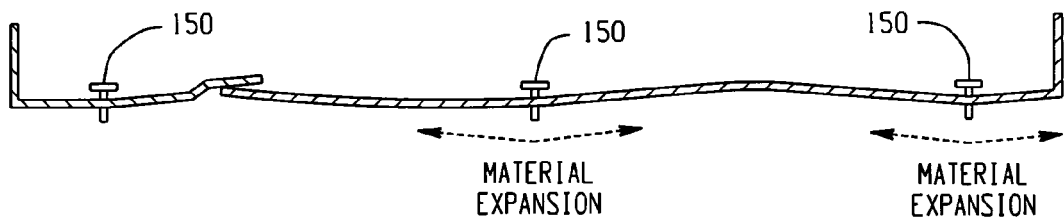
Figure 14A:
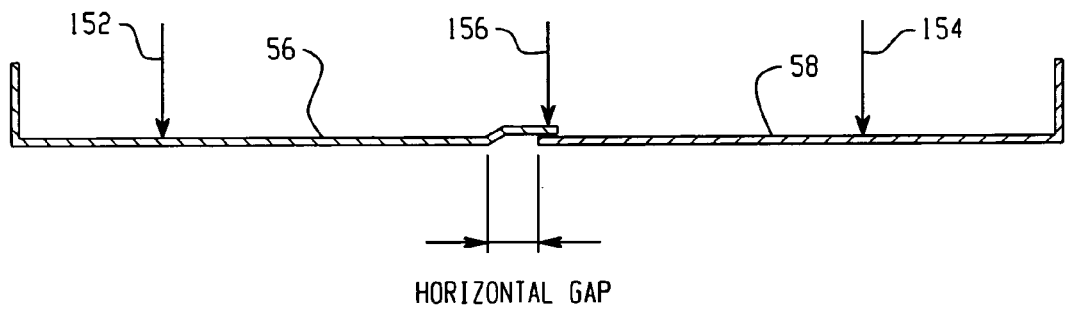
FIGS. 14A and 14B exemplify the floor assembly of FIG. 10 in use.
Figure 14B:
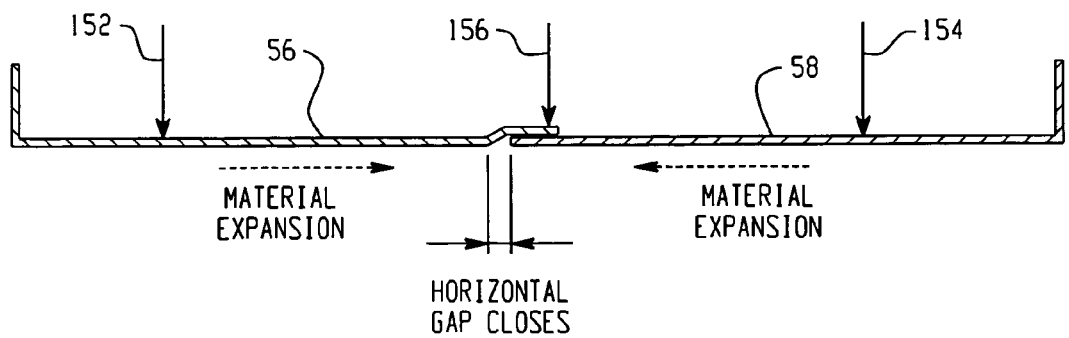

The multi-piece (2 or more floor panels) construction also accommodates thermal expansion. Notably, FIGS. 13A and 13B illustrate buckling that can occur with anchored floors having anchor points 150. In particular, FIG. 13A illustrates two oven floor panels when at ambient temperature and FIG. 13B illustrates the buckling that can occur due to thermal expansion at elevated oven temperatures. In contrast, FIGS. 14A and 14B illustrate the accomodation of thermal expansion by the above described floor assembly. In particular, FIG. 14A illustrates the relative position of the floor panels 56, 58 at ambient temperature and FIG. 14B illustrates the accomodation of thermal expansion that occurs in the overlap region 74 of the panels at elevated oven temperatures.

Threshold member 62 constrains the floor panels 56 and 58 from upward deformation using the constraining members 98, 100 and 102, each capturing and/or applying an associated force, represented by arrows 152, 154 and 156, near the front of the floor panels. The constraining members 98, 100 and 102 can maintain the front of the floor panels 56, 58 in their initial, relatively flat shapes by applying the forces 152, 154 and 156 in instances where sections of the first and/or floor panels 56, 58 might buckle due to heated operating conditions. Threshold member 62 can also provide a relatively tight seal at the bottom of the oven door, between the door jambs 120 and 122 (FIG. 10) and adjacent the floor panels 56 and 58.

Threshold member 62 can provide additional advantages. For example, the threshold member 62, due to its connection to the door jambs 120 and 122, can provide added support for the door frame 20, which can maintain the shape the door frame 20. As can best be seen by FIGS. 5 and 5A, the threshold member 62 has a relatively flat front edge 158 (FIG. 10) without any lip or other protrusion, which can allow for easy insert and removal of a baking rack, for example, by rolling the rack over the front edge 158 of the threshold member. As also seen in FIG. 5, the constraining members 98, 102 and 100 may be spaced apart from each other to provide relatively unobstructed rolling paths 170 and 172 therebetween, the rolling paths located to encompass the location of rollers on the bottom of the oven rack that is used to move product into and out of the oven. In rolling path 170, the edge 96 of the bottom plate abuts closely to front edge 75 of the floor panel 96 and in rolling path 172, edge 96 abuts closely to front edge 77 of floor panel 54.

In some embodiments, the threshold member 62, floor panel 56 and floor panel 58 may be provided separately from the oven 10, for example, as a kit to be retrofitted to a pre-assembled oven already located at a baking location. Along with the threshold member 62 and the floor panels 56, 58, sealant, fasteners and any other connections such as trim pieces 142 may be provided. This can allow for assembly of the floor of the oven on site at the baking location.

Although the invention has been described and illustrated in detail it is to be clearly understood that the same is intended by way of illustration and example only and is not intended to be taken by way of limitation.

What is claimed is:

1. An oven installed at a baking site, the oven comprising:
a baking chamber defined by at least first and second walls;
a door frame defining an opening to the baking chamber;
a first baking chamber floor panel;
a second baking chamber floor panel partially overlapping a portion of the first floor panel to form an overlap region between the first and second floor panels; and
a threshold member located at the opening and extending between opposite sides of the door frame, the threshold member overlapping an edge portion of at least one of the second floor panel or the first floor panel;
wherein the first floor panel and the second floor panel are mounted to enable relative movement between the panels in the overlap region.

2. The oven of claim 1, wherein the threshold member includes a bottom plate and a first constraining member extending beyond an edge of the bottom plate and over the edge portion.

3. The oven of claim 2, wherein the first constraining member overlaps both the first floor panel and the second floor panel at a location aligned with the overlap region.

4. The oven of claim 2, wherein the threshold member includes a second constraining member extending beyond the edge of the bottom plate and over the first floor panel.

5. The oven of claim 4, wherein the threshold member includes a third constraining member extending beyond the edge of the bottom plate and over the second floor panel.

6. The oven of claim 5, wherein the first, second and third constraining members are spaced apart to provide first and second rolling pathways therebetween.

7. The oven of claim 2, wherein the door frame includes a first doorjamb, the threshold member including a first mount extending upwardly from the bottom plate, the first mount being located adjacent a first side of the first doorjamb.

8. The oven of claim 7, wherein the threshold member includes a bracket extending upwardly from the bottom plate, the bracket located at a second side of the first doorjamb, the second side opposite the first side.

9. The oven of claim 8, wherein the bracket is secured to the first door jamb.

10. The oven of claim 8, wherein the bottom plate is partially located between a bottom of the first doorjamb and building floor.

11. The oven of claim 10 further comprising a sealant applied between the bottom of the first doorjamb and bottom plate.

12. The oven of claim 8, wherein the threshold member includes a second mount extending upwardly from the bottom plate, the second mount secured to a side of a second door jamb of the door frame.

13. The oven of claim 1, wherein the threshold member is affixed to a building floor.

14. The oven of claim 13, wherein the threshold member is affixed to spaced apart jambs of the door frame.

15. The oven of claim 1 further comprising a sealant located in a gap between the threshold member and the first and second floor panels.

16. An oven installed at a baking site, the oven comprising:
a baking chamber defined by at least first and second walls;
a door frame defining an opening to the baking chamber;
a first baking chamber floor panel;
a second baking chamber floor panel partially overlapping a portion of the first floor panel to form an overlap region between the first and second floor panels;
a threshold member located at the opening and extending between opposite sides of the door frame, the threshold member overlapping an edge portion of at least one of the second floor panel or the first floor panel; and
a door connected to the door frame wherein the threshold member is affixed to at least one of the door frame or a building floor only at one or more locations outside an internal side of a door footprint that is formed with the door in a closed position.

17. The oven of claim 16, wherein the first floor panel and the second floor panel are arranged to float relative to the building floor.

18. An oven including a baking chamber, a door frame defining an opening to the baking chamber and a door connected to the door frame, the door resting in a threshold region when the door is in a closed position, the oven comprising:
a floor construction; and
a threshold member at least partially disposed in the threshold region, the threshold member including a first upwardly extending member adjacent a side of a first doorjamb of the door frame and a second upwardly extending member adjacent a side of a second doorjamb of the door frame, a spacing between the first upwardly extending member and the second upwardly extending member set at a distance for truing up the door frame;
wherein the threshold member overlaps the floor construction at a location in the baking chamber;
wherein the threshold member is affixed to a building floor only at a location outside the baking chamber.

19. The oven of claim 18, wherein the floor construction comprises a first floor panel that overlaps a second floor panel.

20. An oven including a baking chamber, a door frame defining an opening to the baking chamber and a door connected to the door frame, the door resting in a threshold region when the door is in a closed position, the oven comprising:
a floor construction; and
a threshold member at least partially disposed in the threshold region, the threshold member including a first upwardly extending member adjacent a side of a first door jamb of the door frame and a second upwardly extending member adjacent a side of a second door jamb of the door frame, a spacing between the first upwardly extending member and the second upwardly extending member set at a distance for truing up the door frame;
wherein the threshold member overlaps the floor construction at a location in the baking chamber;
wherein the threshold member is affixed to the door frame at a location only outside the baking chamber.

21. The oven of claim 20, wherein the threshold member comprises a bottom plate and one or more constraining members that extend over an edge of the bottom plate to overlap the floor construction.

22. An oven installed at a baking site, the oven comprising:
a baking chamber defined by at least first and second walls;
a door frame defining an opening to the baking chamber;
a first baking chamber floor panel;
a second baking chamber floor panel partially overlapping a portion of the first floor panel to form an overlap region between the first and second floor panels, wherein the first floor panel and the second floor panel are mounted to enable relative movement between the panels in the overlap region; and
a threshold member located at the opening and extending between opposite sides of the door frame, the threshold member including a first constraining member extending beyond an edge of the bottom plate overlapping an edge portion of both the first floor panel and the second floor panel at a location aligned with the overlap region, a second constraining member extending beyond the edge of the bottom plate and over the first floor panel, a third constraining member extending beyond the edge of the bottom plate and over the second floor panel, the first, second and third constraining members are spaced apart to provide first and second rolling pathways therebetween.

23. An oven installed at a baking site, the oven comprising:
a baking chamber defined by at least first and second walls;
a door frame defining an opening to the baking chamber;
a first baking chamber floor panel;
a second baking chamber floor panel partially overlapping a portion of the first floor panel to form an overlap region between the first and second floor panels; and
a threshold member located at the opening and extending between opposite sides of the door frame, the threshold member overlapping an edge portion of at least one of the second floor panel or the first floor panel;
the door frame includes a first doorjamb, the threshold member includes a first mount extending upwardly from the bottom plate, the first mount being located adjacent a first side of the first door jamb; and
the threshold member includes a bracket extending upwardly from the bottom plate, the bracket located at a second side of the first doorjamb, the second side opposite the first side.

* * * * *